(12) United States Patent
Benker et al.

(10) Patent No.: US 11,705,598 B2
(45) Date of Patent: *Jul. 18, 2023

(54) METHOD OF PRODUCING A VEHICLE TRACTION BATTERY AND A CORRESPONDING PRODUCTION DEVICE

(71) Applicant: AUDI AG, Ingolstadt (DE)

(72) Inventors: Tobias Benker, Heilbronn (DE); Michael Frauenhofer, Aichach (DE); Oliver Schieler, Gaimersheim (DE); Andreas Buer, Neudenau (DE)

(73) Assignee: AUDI AG, Ingolstadt (DE)

( * ) Notice: Subject to any disclaimer, the term of this patent is extended or adjusted under 35 U.S.C. 154(b) by 124 days.

This patent is subject to a terminal disclaimer.

(21) Appl. No.: 17/110,721

(22) Filed: Dec. 3, 2020

(65) Prior Publication Data

US 2021/0193980 A1    Jun. 24, 2021

(30) Foreign Application Priority Data

Dec. 20, 2019 (DE) ..................... 10 2019 135 382.3

(51) Int. Cl.
| | |
|---|---|
| *H01M 50/24* | (2021.01) |
| *B60K 1/04* | (2019.01) |
| *H01M 10/625* | (2014.01) |
| *H01M 10/653* | (2014.01) |
| *H01M 50/204* | (2021.01) |
| *H01M 50/249* | (2021.01) |
| *G01B 11/24* | (2006.01) |

(52) U.S. Cl.
CPC ............... *H01M 50/24* (2021.01); *B60K 1/04* (2013.01); *G01B 11/24* (2013.01); *H01M 10/625* (2015.04); *H01M 10/653* (2015.04); *H01M 50/204* (2021.01); *H01M 50/249* (2021.01); *H01M 2220/20* (2013.01)

(58) Field of Classification Search
None
See application file for complete search history.

(56) References Cited

U.S. PATENT DOCUMENTS

2016/0322677 A1\* 11/2016 Jung .................... H01M 50/109
2021/0194036 A1\*  6/2021 Benker ............... H01M 50/204

FOREIGN PATENT DOCUMENTS

| DE | 103 20 186 A1 | 12/2004 |
|---|---|---|
| DE | 10 2017 128 529 A1 | 6/2019 |
| DE | 102018010 115 A1 | 6/2019 |

(Continued)

OTHER PUBLICATIONS

Examination Report dated Apr. 30, 2020 in corresponding German application No. 10 2019 135 382.3; 10 pages including Machine-generated English-language translation.

*Primary Examiner* — Carmen V Lyles-Irving
(74) *Attorney, Agent, or Firm* — Maier & Maier, PLLC

(57) ABSTRACT

A method for producing a traction battery of a motor vehicle. A battery housing of the traction battery has a receiving compartment for receiving a cell module. It is thus provided that the receiving compartment is delimited by a bottom and walls adjoining said bottom, A topography of the bottom is recorded by measuring technology, a thermal-conductor amount determined by the topography is applied locally to the bottom, whereupon the cell module is inserted into the receiving compartment.

10 Claims, 1 Drawing Sheet

(56) References Cited

FOREIGN PATENT DOCUMENTS

| | | |
|---|---|---|
| DE | 10 2018 208 027 A1 | 7/2019 |
| DE | 11 2017 004 606 T5 | 8/2019 |
| WO | 2013/023969 A2 | 2/2013 |

* cited by examiner

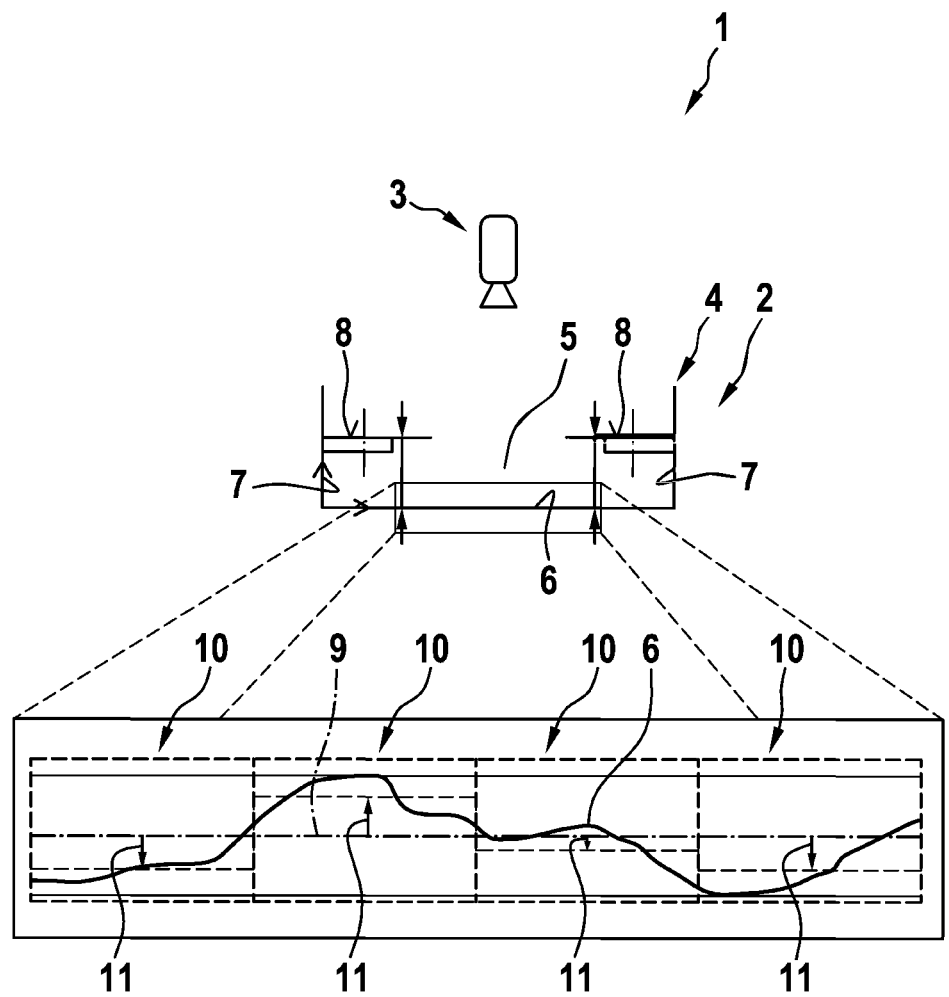

METHOD OF PRODUCING A VEHICLE TRACTION BATTERY AND A CORRESPONDING PRODUCTION DEVICE

FIELD

The disclosure relates to a process for producing a vehicle traction battery, wherein the traction battery housing has a compartment for receiving a cell module. The disclosure further relates to a production device for producing a traction battery.

BACKGROUND

The publication DE 10 2017 128 529 A1 represents a prior-art document. It describes a vehicle battery, i.e., a vehicle traction battery with a battery housing having a housing interior, which is delimited in sections by a housing frame and a housing bottom, having several battery modules arranged inside the housing, and having at least one first cooling channel formed in the area of the housing bottom for cooling the battery modules from a first side. The housing interior is delimited opposite the housing bottom by a housing cover or a housing lid, wherein at least one second cooling channel is formed in the area of the housing cover, or the housing lid, in order to cool the battery modules from a second side.

Furthermore, the publication DE 103 20 186 A1 discloses a thermal paste for thermal coupling a power semiconductor component to a heat sink. The thermal paste consists of a base material and at least one filler. The individual components have the following properties: a dynamic viscosity of the base material between 25 and 500 mPa, at least one filler consisting of metal particles, the filler(s) having a particle size less than 20 µm, and the thermal paste having a filling degree of the filler(s) between 20 and 70%. This results in a thermal paste with a specific resistance of less than 100 Ohm and a thermal resistance of 3.4 W/(K·m).

SUMMARY

The object of the disclosure is to propose a method for producing a vehicle traction battery, which method has advantages over the prior-art methods, in particular by reducing the amount of thermal conductor required during production.

This object is achieved according to the disclosure by a method for producing a traction battery. The receiving compartment is provided such that it is delimited by a bottom and the walls adjoining the bottom, wherein a bottom topography is measured, a thermal-conductor amount determined by the topography is applied locally on the bottom, whereupon the cell module is inserted into the receiving compartment.

The described process is used to produce the traction battery, which is preferably installed as a vehicle component, but may also be located separately therefrom. The traction battery is used to temporarily store electrical energy, which electrical energy is used in particular to operate a drive system or a vehicle drive unit. Thus, the electrical energy stored in the traction battery is used to generate a driving torque intended to drive the vehicle by means of the drive system or the power unit.

The traction battery comprises the battery housing and at least one cell module. The receiving compartment is formed in the battery housing, which compartment is provided and designed to receive the cell module. The receiving compartment is delimited by the bottom and walls of the battery housing. For example, contact areas are formed on the walls, which in particular extend parallel to the bottom. The contact areas serve to support the cell module according to its arrangement in the receiving compartment. The contact areas are preferably arranged such that the cell module is spaced apart from the battery housing bottom after its arrangement in the receiving compartment, while it is supported on the contact areas. In this way, tolerances in the dimensions of the cell module and battery housing can be reliably compensated The cell module is used for temporary electrical energy storage; thus, the cell module has at least one battery cell, preferably several battery cells, which are electrically interconnected. A single cell module is preferably arranged in the battery housing, as are several cell modules in the battery housing. Such a design results in the battery housing having as many receiving compartments as cell modules, whereby each receiving compartment is delimited by the bottom of the battery housing. Moreover, the receiving compartments are separated from one another by the walls of the battery housing. This means that one of the walls of the battery housing is located between two of the receiving compartments. When producing the traction battery, the cell modules are preferably arranged in the receiving compartments, and furthermore, the cell modules are electrically connected.

The optional contact areas are provided, e.g., on mounting elements, which extend from at least one or more of the walls of the battery housing. The fastening elements are preferably connected to the wall(s) with a material bond, e.g., glued or welded thereon. The cell module preferably has mating contact areas, which, after arrangement of the cell module in the receiving compartment, contact the contact areas particularly in a flat or planar manner, such that the cell module is supported in the receiving compartment and spaced apart from the bottom. Consequently, the cell module does not touch the bottom and is only indirectly connected thereto, i.e., via the thermal conductor.

During operation of the traction battery, in particular when the traction battery is being charged or discharged, heat is generated on or inside the cell module, which heat must be dissipated at least temporarily to prevent the cell module from overheating. Moreover, the cell module may be provided to be temporarily heated so as to enable rapid charging or providing high performance. For this purpose, the battery housing is preferably passively or actively tempered, in particular cooled or heated. In terms of passive cooling, at least one heat sink is arranged at the battery housing, or the battery housing, itself, is designed as a heat sink in certain areas. In terms of active cooling, the battery housing may be provided to have at least one coolant channel, through which coolant flows at least temporarily, during operation of the traction battery. Additional or alternative heating media may be provided for heating the battery housing.

For effective tempering of the cell module, a thermal connection needs to be established between the cell module and the battery housing. Accordingly, during the production of the traction battery, the thermal conductor is introduced into the receiving compartment, i.e., applied to the bottom. Subsequently, the cell module is inserted into the receiving compartment, whereby it contacts the thermal conductor. Thus, the thermal conductor contacts the cell module, as well as the battery housing, thereby thermally interconnecting them. It may further be provided that the module, after insertion into the receiving compartment, is supported by the contact areas, which set it apart from the bottom.

For example, a multi-component thermal conductor is used as a thermal conductor, which consists of at least a first component and a second component for this purpose. For example, the first component may be a carrier material and the second component a filler, such that thermal conductivity of the thermal conductor is primarily achieved by means of the filler. Thus, the filler preferably has higher thermal conductivity than does the carrier material. The thermal conductor is generally in the form of a liquid or a paste. The latter is understood to be a solid-liquid mixture, wherein, e.g., the first component is a liquid and the second component a solid. The second component may, e.g., contain or consist of metal particles. The proportion of the second component in the thermal conductor is particularly preferably at least 50%, at least 60%, at least 70%, or at least 80%. Thus, the two components may be present in the thermal conductor in a quantitative ratio of 1:1. This results in particularly good heat conduction due to the thermal conductor. The choice of components may also be made such as to control a cross-linking reaction, which causes the thermal conductor to set after its arrangement between the cell module and the bottom.

The amount of thermal conductor to be applied to the bottom can be determined by the distance between the bottom and the cell module, as well as the area of the bottom. The distance is usually determined according to a maximum gap between the cell module and the bottom as determined by a tolerance-chain analysis. One objective is sufficient and process-reliable wetting of thermally active surfaces or a reliable filling of the gap after completed insertion and fastening of the cell module in the receiving compartment. However, the actual distance between the bottom and the cell module remains unknown. If the thermal conductor amount is calculated based on the maximum gap, an inappropriately large amount of thermal conductor is usually introduced into the receiving compartment.

For this reason, measuring the bottom topography and determining the amount of thermal conductor to be applied to the bottom based on the topography are now provided. The determined thermal conductor amount is subsequently applied to the bottom. Next, the cell module is inserted into the receiving compartment. As a result of the battery-housing production process, fairly large deviations within the shape tolerance or flatness occur. The shape-tolerance limits are defined by two imaginary plane surfaces, which extend parallel to a center bottom plane, which in turn describes the ideal gradient of the bottom. For instance, the bottom is produced with a tolerance of at least +/−0.5 mm, at least +/−0.75 mm, or at least +/−1.0 mm. The gradient of the bottom may therefore deviate by 1.0 mm, 1.5 mm or 2.0 mm.

Compensating for this tolerance requires a large amount of thermal conductor. However, this amount may be reduced by measuring the topography and adjusting the amount of thermal conductor according to the topography. In particular, it is provided that a greater amount of thermal conductor be applied to a local bottom recess opposite the ideal bottom center plane than the amount applied to a local projection protruding beyond the ideal center plane. This ensures that a thermal conducting connection is always established between the cell module and the bottom, and that likewise excessive consumption of the thermal conductor is prevented.

The bottom topography describes a bottom height profile, preferably relative to the ideal center plane. The topography thus reflects whether the bottom is located in the ideal center plane, or whether it is receding or protruding relative thereto. This information is used to adjust the thermal conductor amount. This enables local adjustment, whereby the topography is evaluated for several bottom locations, such that for each location the appropriate thermal conductor amount is determined. For example, a certain specified amount of thermal conductor is applied locally, on condition that the bottom is in the ideal center plane. However, if the bottom recedes relative thereto, the amount of thermal conductor is increased over the initial amount, whereas it is reduced if the bottom protrudes relative to the center plane.

At any rate, knowing the bottom topography makes it possible to calculate the distance between the bottom and the cell module with much greater precision than is the case without this measurement and only knowing the production tolerances of the battery housing. Similarly, the amount of thermal conductor to be introduced into the receiving compartment can be calculated with greater precision. After introducing the calculated amount of thermal conductor, the cell module is inserted into the receiving compartment, such that it contacts the thermal conductor. It may further be provided that the cell module is designed to be supported by the contact surfaces. The above-described procedure allows for significantly reducing the required amount of thermal conductor.

A further development of the disclosure provides for recording the topography by means of an optical measuring device. This means that the topography is determined optically. For example, the measuring equipment uses an electro-optical distance measurement or a laser-distance measurement. Preferably a 3D scanner is used as a measuring device. It may be used, in particular, for strip-light projection or strip-light topometry. The optical measuring device allows for the topology to be recorded very quickly and with high precision.

A further development of the disclosure provides for the use of a camera as a measuring device. The camera is designed to capture depth information of the recorded image. Preferably, a 3D camera is used for this purpose. For example, the camera measures the local distance to the bottom through the use of a transit-time method. Using the camera, in turn, enables extremely fast and accurate recording of the bottom topography.

A further development of the disclosure provides for the topography to be recorded relative to an imaginary center plane of the bottom. The imaginary center plane preferably corresponds to the ideal bottom center plane, i.e. without tolerance. As for topography, any projections and/or recesses of the bottom relative to the imaginary center plane are recorded and used to calculate the amount of thermal conductor. This results in a significant reduction of the thermal conductor.

A further development of the disclosure provides for calculating the amount to be applied locally based on the distance between a local position of the bottom obtained from the recorded topography and the imaginary center plane. First, the local bottom position or a local bottom height is obtained from the recorded topography. In other words, the position or height at a certain bottom location is determined by the recorded topography. Based on the bottom position, the distance of the bottom from the imaginary center plane is calculated at this location. From this, the amount of thermal conductor to be applied locally at this location is derived. Preferably, the described procedure is performed for different bottom locations, such that the amount of the thermal conductor to be applied locally there is calculated and subsequently applied for several bottom locations. The result is a reduction of the required thermal conductor amount.

A further development of the disclosure provides for the bottom to be divided into several bottom areas, and the amount to be applied locally to be calculated separately for each of the bottom areas, using the same imaginary center plane for the bottom area. Hence, the amount of the thermal conductor is not measured continuously, but discretely for the several bottom areas and then applied there. For example, the bottom areas are immediately adjacent to one another, however in each case they are assigned to the same receiving compartment, whereby they delimit the receiving compartment, especially downward. The same imaginary center plane is used for the bottom areas. For example, it is provided to first record the topography of the whole bottom, or the whole bottom areas, and to calculate the imaginary center plane based on the topography, e.g., as a mean value for the several bottom areas. Subsequently, the (mean) distance from the bottom to the center plane is calculated separately for each of the bottom areas and on this basis, the thermal conductor amount to be applied locally is determined. The above-described procedure is simple and can be implemented in a process-safe manner, and produces the desired reduction in the thermal conductor amount.

A further development of the disclosure provides for applying the thermal conductor using an application device moving at a certain speed above the bottom, whereby a thermal-conductor throughput of the application device is adjusted such that the calculated amount of thermal conductor is applied to the bottom, in particular with a constant layer thickness. The application device may be, e.g., a nozzle or have a nozzle. The application device is provided and designed in particular for applying the thermal conductor in the form of a thermal conductor bead. The thickness of the heat-conducting layer applied to the bottom is determined by the speed at which the application device moves above the bottom. Moreover, the thickness depends on the thermal conductor throughput, with which the thermal conductor is output from the application device and applied to the bottom.

It is now preferable that the speed of the application device be preset and constant, or at least follow a specified speed profile. The thermal conductor amount is adjusted accordingly via the thermal conductor throughput. For this purpose, the calculated amount of thermal conductor and its speed is used to calculate the thermal-conductor throughput, which ensures that the calculated amount of thermal conductor is applied to the bottom. Subsequently, the calculated thermal conductor throughput is adjusted at the application device. It is, for example, provided that the thermal conductor is applied to the bottom with a constant layer thickness or as a thermal conductor bead. When applied as a thermal conductor bead, the thermal conductor is pressed into the receiving compartment, when inserting the cell module, and a thermal conductor layer is formed between the cell module and the bottom. The described procedure ensures that the thermal conductor is provided between the bottom and the cell module with a high degree of process reliability.

A further development of the disclosure provides that the same speed is used for the several bottom areas and that the thermal conductor throughput for each of the receiving compartments is calculated and adjusted separately based on the required amount of thermal conductor, or that the same thermal conductor throughput is used for the several bottom areas and the speed for each of the receiving compartments is calculated and set independently of the required amount of thermal conductor. In principle, different procedures for applying the required amount of thermal conductor on the bottom are therefore conceivable.

The same speed or at least the same speed profile may be used for the several bottom areas of the receiving compartment. In this case, the thermal conductor throughput is calculated as a function of the speed and the amount of thermal conductor required for the relevant bottom area. If, in contrast, the same thermal conductor throughput is to be used for the several bottom areas of the receiving compartment, the speed as a function of the amount of required thermal conductor is used. Naturally, in each case, it is also possible to select both the speed and the thermal conductor throughput. The described procedure allows for easy conversion of existing production facilities, whereby the traction battery can be produced in a cost-efficient manner.

A further development of the disclosure provides for the thermal conductor throughput to be set higher at the beginning and end of the application, than between these two end points. Within a certain time period after the start and a certain time period before the application has finished, a different thermal conductor throughput is selected than between these two end points. Additionally, or alternatively, the speed can be set lower at the start and end of the application than between these two end points. Both entail the application of a larger amount of a thermal conductor at the beginning and end of the application, such that, for example, the layer thickness is greater than between these two end points. In addition or alternatively, a larger area of the bottom is moistened at the beginning and end of the application than in between these two end points. This results, e.g., in a typical bone shape of the applied thermal conductor. A particularly good thermal connection between the cell module and the battery housing is thus ensured.

A further development of the disclosure provides that the receiving compartment be a part of several receiving compartments of the battery housing, whereby the topography of the bottom is measured separately for each of the receiving compartments, and the amount of heat conducting medium is determined based on the topography. Thus, the battery housing does not have a single compartment, but instead several compartments. The explanations provided in this description addressing the receiving compartment preferably apply to each of these several receiving compartments, as well. It is further preferred that one of several cell modules be arranged in each of these compartments. In order to reliably allow for the local bottom conditions, the bottom topography should be determined separately for each of the receiving compartments.

The disclosure further relates to a production device for producing a vehicle traction battery, in particular for carrying out the method according to the explanations of this description, wherein a traction battery housing has a compartment for receiving a cell module. In this context, it is provided that the receiving compartment be delimited by a bottom and walls adjoining said bottom, whereby the production device is provided and designed to measure a bottom topography, to apply an amount of thermal conductor locally on the bottom as determined by the topography, and subsequently insert the cell module into the receiving compartment.

The advantages of such a design of the production facility or such an approach were explained above. Both the production facility and the operating procedure may be further developed as explained in this description, i.e., incorporated by reference

BRIEF DESCRIPTION OF THE FIGURE

The disclosure will be explained in more detail below with reference to the exemplary embodiments shown in the drawing, without limiting the disclosure. The single FIGURE is a schematic diagram of a device for producing a traction battery, as well as a part of the traction battery.

FIG. 1 shows a schematic representation of a manufacturing device for manufacturing a traction battery and part of the traction battery.

DETAILED DESCRIPTION

FIG. 1 is a schematic representation of a device 1 for producing a traction battery 2, as well as a part of the traction battery 2. More specifically, only a measuring device 3 of the production device 1 and only a battery housing 4 of the traction battery 2 are shown. The battery housing 4 has at least one compartment 5 for receiving a cell module not shown here. Receiving compartment 5 is delimited downward by a bottom 6 and laterally by the walls 7. Contact areas 8 are formed on the walls 7, at which the cell module is supported according to its arrangement in the receiving compartment 5. The contact areas 8 are spaced apart from the bottom 6, such that the cell module is spaced apart from the bottom 6, when supported by the contact areas 8.

During the production of the traction battery 2, it is now provided to measure a topography of the bottom 6, i.e., using measuring device 3. For this purpose, measuring device 3 preferably has a camera, in particular a 3D camera. The topography of the bottom 6 is shown by way of example and sectionally enlarged. It can be seen that due to a production tolerance of the bottom 6, local deviations of the bottom 6 occur from an imaginary center plane 9. It is now provided to divide bottom 6 into several bottom areas 10, and for each of the bottom areas 10, to record separately a deviation of bottom 6 from the center plane 9. The result is a mean distance for each of the bottom areas 10 from the center plane 9, which is indicated here by arrows 11 by way of example.

For each of the bottom areas 10, an amount of thermal conductor is then calculated based on the topography or the respective distances, which is to be applied locally on the bottom 6 in the corresponding bottom area 10 to compensate for the production tolerances of bottom 6, at least on average. In particular, more thermal conductor is applied in bottom area 10, in which a mean height of bottom 6 is below the center plane 9, than in bottom area 10, where this is not the case, or in which the mean height is above the center plane 9. After determining the required amount of thermal conductor, the thermal conductor is applied to bottom 6, i.e., the amount required in each of the bottom areas 10. This is done with the aid of an application device, not shown here.

With the described procedure, a significant reduction of the required amount of thermal conductor is achieved, in that the application of the thermal conductor is done according as needed and depending on the production tolerance of the bottom 6. This leads to an overall improvement in the production process, in that a lower contact pressure is needed in order to insert the cell module into the receiving compartment 5, than was previously the case. Moreover, the costs of traction battery 2 are reduced due to the lower amount of thermal conductor.

REFERENCE NUMERAL LIST

1 Production facility
2 Traction battery
3 Measuring device
4 Battery housing
5 Receiving compartment
6 Bottom
7 Wall
8 contact area
9 Center plane
10 bottom area
11 Pillar

The invention claimed is:

1. A method for producing a traction battery of a motor vehicle, the method comprising:
    receiving a cell module to be inserted into a receiving compartment of a battery housing, wherein the receiving compartment is delimited by a bottom and walls adjoining the bottom,
    recording a topography of the bottom using an optical measuring device,
    calculating an amount of thermal conductor to apply, wherein the amount of thermal conductor is determined by the topography, and
    after determining an amount of thermal conductor to apply, subsequently applying the thermal conductor at the determined amount of thermal conductor, and inserting the cell module into the receiving compartment,
    wherein the topography is recorded relative to an imaginary bottom center plane,
    wherein the amount to be applied locally is calculated based on a distance between a local bottom position derived from the recorded topography and the imaginary bottom center plane.

2. The method according to claim 1, wherein a camera is used as the optical measuring device.

3. The method according to claim 1, further comprising:
    dividing the bottom into several bottom areas, and
    for each of the bottom areas, separately calculating the amount to be applied locally, whereby the same imaginary center plane is used for the bottom areas.

4. The method according to claim 1, wherein the thermal conductor is applied by an application device moving at a certain speed over the bottom, wherein a thermal conductor throughput of the application device is set, such that the amount of thermal conductor determined by the topography is applied to the bottom.

5. The method according claim 4, wherein the certain speed is used for the several bottom areas, and the thermal-conductor throughput for each of the receiving compartments is calculated and set separately based on the amount of thermal conductor determined by the topography, or wherein the same thermal-conductor throughput is used for the several bottom areas, and the speed for each of the receiving compartments is calculated and set separately from the amount of thermal conductor determined by the topography.

6. The method according to claim 1, wherein the thermal conductor throughput is set higher at the beginning and the end of the application than between these two end points.

7. A production device for producing a traction battery of a motor vehicle, in particular for carrying out the method according to claim 1, wherein a battery housing of the traction battery has a receiving compartment for receiving a cell module, wherein the receiving compartment is delimited by a bottom and walls adjoining the bottom, wherein the production device is provided and designed to record a topography of the bottom by measuring technology in order to apply an amount of thermal conductor, as determined by the topography, locally on the bottom, and subsequently insert the cell module into the receiving compartment.

8. The method according to claim 2, wherein the thermal conductor is applied by an application device moving at a certain speed over the bottom, wherein a thermal conductor throughput of the application device is set, such that the amount of thermal conductor determined by the topography is applied to the bottom.

9. The method according to claim 3, wherein the thermal conductor is applied by an application device moving at a certain speed over the bottom, wherein a thermal conductor throughput of the application device is set, such that the amount of thermal conductor determined by the topography is applied to the bottom.

10. The method according to claim 2, wherein the thermal conductor throughput is set higher at the beginning and the end of the application than between these two end points.

\* \* \* \* \*